Oct. 31, 1950          G. T. LYON          2,528,280
PROCESS OF FABRICATING TUBULAR FITTINGS
Filed May 22, 1946
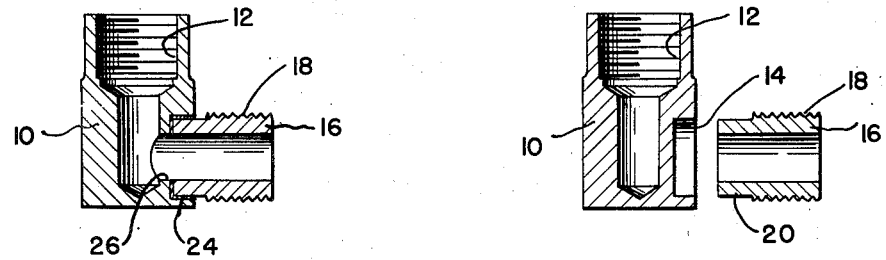
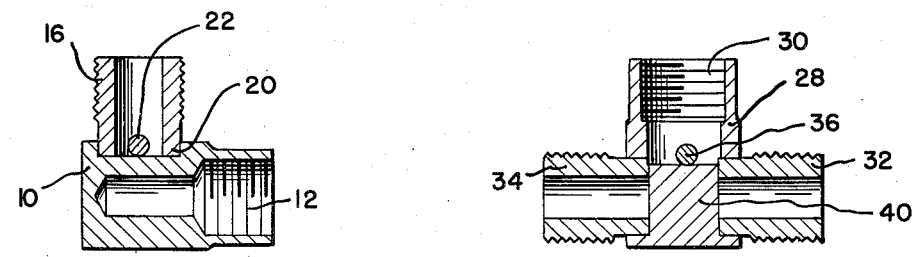
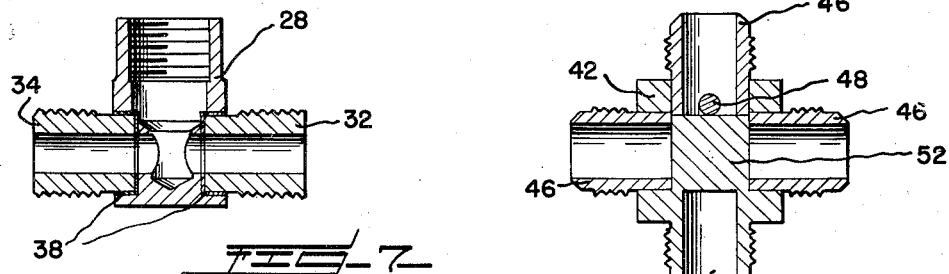
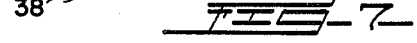
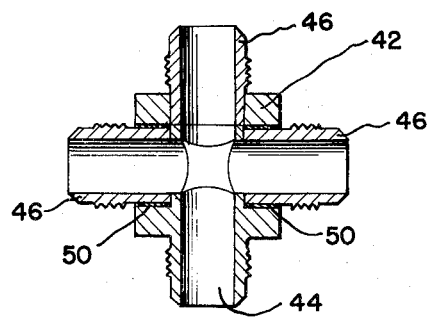
*INVENTOR.*
GILBERT T. LYON.
BY
*Parker and Burton*
ATTORNEYS.

Patented Oct. 31, 1950

2,528,280

UNITED STATES PATENT OFFICE 2,528,280

PROCESS OF FABRICATING TUBULAR FITTINGS

Gilbert T. Lyon, Van Dyke, Mich.

Application May 22, 1946, Serial No. 671,640

5 Claims. (Cl. 29—157)

This invention relates to an improved process of fabricating a fitting having a fluid passageway therethrough.

Such fittings are commonly employed in hydraulic lines to connect different sections of tube together to build up the hydraulic system.

More specifically it might be stated that an object of the invention is an improved process for forming a passageway and particularly an angular passageway through a fitting, which passageway will present a clean, smooth, uniform surface to the flow of fluid.

Another object is the provision of a process of the character described which is simple, inexpensive and efficient and which results in a fitting which may include a fitting body that defines one portion of an angular passageway and a tubular nipple that defines another portion of the angular passageway and which nipple is so welded to the structure of the body that the joint formed therebetween is completely sealed throughout and the passageway defined in the body and in the nipple is clean-cut and free from any obstruction that might interfere with the flow of fluid through the passageway.

Heretofore one method of forming a fitting of this character has been to cut the same from an integral block of metal forming the passageway therein. Such a fitting was integral throughout and did not exhibit any joints and provided a desirable structure but was expensive and wasteful of material.

Another practice which has been followed has been to provide a fitting body with a passageway leading thereinto from one side and a second passageway leading thereinto from another side and opening into the first passageway. The second passageway was provided with a counterbore into which one end of a nipple was fitted. Within the bottom of the counterbore or at the top thereof encircling the nipple a copper ring was positioned. The fitting was then placed in a hydrogen furnace and the copper was melted, welding the nipple and body together.

The second practice immediately above referred to sometimes resulted in imperfectly welded joints and it was difficult to determine from visual inspection whether or not the weld was complete throughout the joint. Also, another undesirable occurrence was that some of the copper at times flowed down into the angular passageway through the body, and this had to be removed or the passageway through the body would be obstructed by such copper fillet.

My particular process involves hydrogen furnace welding with copper, but the method employed differs from the method last above described to such a degree that I provide a weld which is uniform throughout the joint and the welding is so carried out that copper cannot flow down into the passageway through the body to form undesirable protuberances therein.

Various other advantages and meritorious features of my improved process will appear more completely from the following description, appended claims and accompanying drawings which illustrate the sequence of steps involved in carrying out this invention as applied to slightly different types of fittings.

In the drawings:

Figure 1 illustrates a simple L-shaped fitting exhibiting my invention and being completely formed.

Figure 2 illustrates the two component parts which go to make up the fitting shown in Figure 1.

Figure 3 illustrates an intermediate step in the fabrication of the fitting shown in Figure 1.

Figure 4 illustrates a similar intermediate step in the fabrication of a fitting designed to be provided with a T-shaped passageway as distinguished from an L-shaped passageway.

Figure 5 illustrates the fitting of Figure 4 completely formed.

Figure 6 illustrates a fitting, designed to have a cross-shaped passageway therethrough when completed, at an intermediate step in the carrying out of the process of fabrication.

Figure 7 illustrates the fitting of Figure 6 with the cross-shaped passageway completed.

In fabricating a fitting having an L-shaped passageway such as is shown in Figure 1, I provide a fitting body portion indicated in Figures 2 and 3 by the numeral 10. A passageway recess 12 is formed which extends into this body portion from one side as is shown in the several figures of the drawing. The outer end of this recess passageway is counterbored and interiorly threaded to receive a threaded element. The interior end is shaped as shown. The body is provided with a counterbored recess 14 which is shown in Figure 2 as disposed angularly with respect to the passageway recess 12 but does not communicate therewith.

A nipple element 16 is provided. This nipple is externally threaded at one end as at 18. The opposite end 20 is slightly larger than the counterbore 14 and is adapted to be press fitted thereinto forming a tight press fit therewith as shown in Figure 3. A copper slug or ball of suitable welding metal 22 is placed within the interior of the nipple 16 resting upon the bottom of the counterbore.

The assembled fitting, that is, the fitting body 10 with the nipple 16 and the copper slug 22, is then placed within a hydrogen furnace with the nipple 16 projecting upwardly and heated to a point sufficiently above the point of fusion of the copper to melt it and cause it to flow over the bottom of the counterbore and by capillary action it flows through the joint over the bottom of the counterbore underneath the end of the nipple 16 and up the side walls and forms a tight welded joint throughout. In Figure 1 this weld is indicated as 24 in considerably exaggerated thickness. As a matter of fact, the thickness of copper would be very thin, and in a perfectly welded joint it has generally been found that the copper even flows over the outer face of the fitting body that surrounds the nipple. The copper color evidences this.

After the fitting is taken out of the furnace that portion of the metal at the bottom of the counterbore below the passageway through the nipple is cut away as at 26 in Figure 1 forming the L-shaped passageway through the fitting.

The fabrication of the T-shaped passageway fitting illustrated in Figures 4 and 5 is generally similar to that hereinabove described. There is a fitting body 28 provided with a passageway recess 30 leading thereinto from one side. From opposite sides there are two counterbores into which nipples 32 and 34 are fitted as shown in Figure 4. It will be noted in this figure that these counterbore recesses cut slightly into the recess 30 of the passageway in the fitting body. The assembled fitting shown in Figure 4, with a copper slug 36 disposed within the interior of the passageway recess 30, is placed in the hydrogen furnace and heated as hereinabove described and the copper flows through the joints formed between the press fitted nipples 32 and 34 and the counterbores in the body of the fitting 28 forming uniform welded joints indicated by the numeral 38 in Figure 5. The metal portion which intervenes the counterbores and the passageway recess 30 and which is indicated as 40 in Figure 4 is then cut away forming the T-shaped passageway shown in Figure 5.

Figures 6 and 7 illustrate a fitting which has a cross-shaped passageway. Figure 7 illustrates the completed fitting, while Figure 6 illustrates an intermediate step such as has been described hereinabove. The fitting body is indicated by the numeral 42. It is provided with a passageway recess 44 formed thereinto from one side. Three counterbores are cut into this block 42 and into each of these counterbores a nipple 46 is press fitted as hereinabove set forth. A copper slug 48 is positioned as shown in Figure 6 and with the assembled fitting occupying such relationship it is disposed within a hydrogen furnace and heated as above described and the copper flows also as above described and forms the brazed joint 50 between the three nipples and the side walls of the counterbore, and after this has been done the metal indicated as 52 in Figure 6 is cut away forming the completed cross-shaped passageway shown in Figure 7.

Examination of fittings formed in this way indicates that a uniform and thorough weld is provided throughout the joint and the passageway is free and clear of any deposit of welding metal.

What I claim is:

1. That method of fabricating a fitting having an angular fluid passageway therethrough comprising providing a fitting body having a passageway thereinto from one side and a recess thereinto from another side directed toward the passageway but terminating short thereof, inserting one end of a tubular member into said recess, placing a slug of bonding metal within the interior of said tubular member upon the bottom of the recess, heating the assembled member and fitting body to melt the bonding metal and cause it to flow over the bottom and up the side wall of the recess to bond the member to the body, and thereafter removing the metal constituting the bottom of the recess and forming communication between the interior of the member and the passageway within the body.

2. That method of fabricating a fitting having an angular fluid passageway therethrough terminating at one end in a nipple comprising providing a fitting body having a passageway recess thereinto from one side and a counterbore recess thereinto from another side directed at an angle to the passageway recess but terminating short thereof, press fitting one end of a nipple into said counterbore recess, placing a copper slug within the interior of the nipple upon the bottom of the counterbore recess, heating the assembled nipple and fitting body within a hydrogen furnace to melt the copper and cause it to flow over the bottom and up the side wall of the counterbore recess to weld the nipple to the body, and thereafter cutting through the bottom of the counterbore recess into the passageway recess forming said angular passageway.

3. That method of fabricating a fitting having an angular fluid passageway therethrough comprising providing a fitting body having a passageway thereinto from one side and a counterbore recess thereinto from another side directed at an angle to the passageway recess but not communicating therewith, press fitting one end of a tubular member into said counterbore recess, placing a copper slug within the interior of the tubular member upon the bottom of the counterbore recess, heating the assembled fitting body and member within a hydrogen furnace with the member projecting upwardly from the body to melt the copper and cause it to flow over the bottom and up the side wall of the counterbore recess to weld the member to the body, and thereafter cutting through the bottom of the counterbore recess into the passageway recess forming said angular passageway.

4. The method of manufacturing fittings comprising first producing a body member including a plurality of communicating shallow bores therein, disposing the cylindrical end of a tubular branch in each shallow bore, placing a slug of brazing material on the bottom of one of the said shallow bores through the tubular branch disposed therein, heating the said fitting to brazing temperature to melt the slug whereby to braze the cylindrical ends of all said tubular branches to the said body member simultaneously, and then drilling into the body member at the base of each shallow bore sufficiently to provide a communicating passage between said branches through said body member.

5. The method of manufacturing fittings comprising first producing a body member including a branch integral therewith having a bore therein, making one or more shallow bores in said body member communicating with each other if more than one but not with the body bore, the axes of said bores being arranged to intersect the axis of the bore in the integral branch, producing tubular branches having an annular end, disposing the annular end of a tubular branch in each shallow bore in said body member substantially seated against the body member at the bottom of the said shallow bore or bores therein, placing a slug of brazing material on the bottom of a shallow bore through the tubular branch disposed therein, heating the said fitting to brazing temperature to melt the slug whereby to braze the cylindrical end of each tubular branch to the said body member, and then removing the wall at the base of each shallow bore whereby to provide communication between the bore in the said body member and the branch or branches brazed thereto.

GILBERT T. LYON.

REFERENCES CITED

The following references are of record in the file of this patent:

UNITED STATES PATENTS

| Number | Name | Date |
| --- | --- | --- |
| 1,146,664 | Stockstrom | July 13, 1915 |
| 1,215,965 | Murray | Feb. 13, 1917 |
| 1,825,042 | Baldwin | Sept. 29, 1931 |
| 2,072,591 | Lindquist | Mar. 2, 1937 |
| 2,257,427 | Parker | Sept. 30, 1941 |
| 2,315,294 | Stewart | Mar. 30, 1943 |
| 2,341,006 | Wissler | Feb. 8, 1944 |

FOREIGN PATENTS

| Number | Country | Date |
| --- | --- | --- |
| 513,749 | Great Britain | of 1939 |
| 43,262 | Netherlands | of 1938 |